US008509377B2

(12) United States Patent
Aktas

(10) Patent No.: US 8,509,377 B2
(45) Date of Patent: Aug. 13, 2013

(54) FUEL BUNDLE DESIGNS USING MIXED SPACER TYPES

(75) Inventor: Birol Aktas, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 0 days.

(21) Appl. No.: 12/572,491

(22) Filed: Oct. 2, 2009

(65) Prior Publication Data

US 2011/0080988 A1    Apr. 7, 2011

(51) Int. Cl.
*G21C 3/34* (2006.01)

(52) U.S. Cl.
USPC ........... 376/442; 376/438; 376/434; 376/426; 376/409

(58) Field of Classification Search
USPC .................... 376/442, 434, 439, 462
See application file for complete search history.

(56) References Cited

U.S. PATENT DOCUMENTS

| | | | | |
|---|---|---|---|---|
| 4,357,298 A | * | 11/1982 | Wolters et al. | 376/441 |
| 4,698,204 A | * | 10/1987 | Taleyarkhan | 376/439 |
| 5,130,083 A | * | 7/1992 | Johansson | 376/441 |
| 5,297,177 A | * | 3/1994 | Inagaki et al. | 376/462 |
| 5,331,679 A | * | 7/1994 | Hirukawa | 376/439 |
| 5,371,768 A | * | 12/1994 | Matzner | 376/439 |

FOREIGN PATENT DOCUMENTS

| | | |
|---|---|---|
| EP | 0514116 A1 | 11/1992 |
| EP | 0611128 A1 | 8/1994 |
| EP | 0619581 A1 | 10/1994 |
| EP | 0692794 A1 | 1/1996 |
| JP | 63120292 A | 5/1988 |
| JP | 1138493 A | 5/1989 |

OTHER PUBLICATIONS

EP 10185586.9, European Search Report and Written Opinion, Feb. 9, 2011.
XP002616758, Database WPI, Week 198826, Thomson Scientific, London, GB, AN 1988-180942, JP 63120292, May 24, 1988.

* cited by examiner

*Primary Examiner* — Jack W Keith
*Assistant Examiner* — Marshall O'Connor
(74) *Attorney, Agent, or Firm* — Harness, Dickey & Pierce, P.L.C.

(57) ABSTRACT

Example embodiment fuel bundles use multiple types of spacers within the same fuel bundle. The type for each spacer location may be determined based on the axial position of the spacer, the characteristics of the spacer type, and the location and coolant characteristics for the particular example fuel bundle including the spacers. Historic performance data for the particular bundle location, predictive modeling, etc. may be used to determine what spacer types at which locations result in the best operating conditions and margins for example fuel bundles.

12 Claims, 4 Drawing Sheets

FUEL BUNDLE DESIGNS USING MIXED SPACER TYPES

BACKGROUND

1. Field

Example embodiments generally relate to fuel structures used in nuclear power plants and methods for using fuel structures.

2. Description of Related Art

Generally, nuclear power plants include a reactor core having fuel arranged therein to produce power by nuclear fission. A common design in U.S. nuclear power plants is to arrange fuel in a plurality of cladded fuel rods bound together as a fuel assembly, or fuel bundle, placed within the reactor core. These fuel bundles typically include several spacing elements placed axially throughout the bundle to dampen vibration of the fuel rods, ensure minimum separation and relative positioning of the fuel rods, and mix coolant flowing axially through the bundle and spacers therein.

As shown in FIG. 1, a conventional fuel bundle 10 of a nuclear reactor, such as a BWR, may include an outer channel 12 surrounding an upper tie plate 14 and a lower tie plate 16. A plurality of full length fuel rods 18 and/or part length fuel rods 19 may be arranged in a matrix within the fuel bundle 10 and pass through a plurality of spacers 20 axially spaced one from the other and maintaining the rods 18, 19 in the given matrix thereof. The fuel rods 18 and 19 are generally continuous from their base to terminal, which, in the case of the full length fuel rod 18, is from the lower tie plate 16 to the upper tie plate 14. Conventionally, a fuel bundle 10 uses spacers 20, all having a same hydraulic or operational characteristic, such that all spacers 20 may be referred to as a single spacer type.

SUMMARY

Example embodiments are directed to a bundle design using multiple types of fuel spacers within the same fuel bundle. The spacer type for each spacer location may be determined based on the axial position of the spacer, the characteristics of the spacer, the coolant characteristics for the particular fuel bundle, the position for the particular fuel bundle, and/or etc. Historic performance data, predictive modeling, and/or engineering analysis may be used to determine what spacer types at which locations result in the best operating conditions and margins for example fuel bundles.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 2:
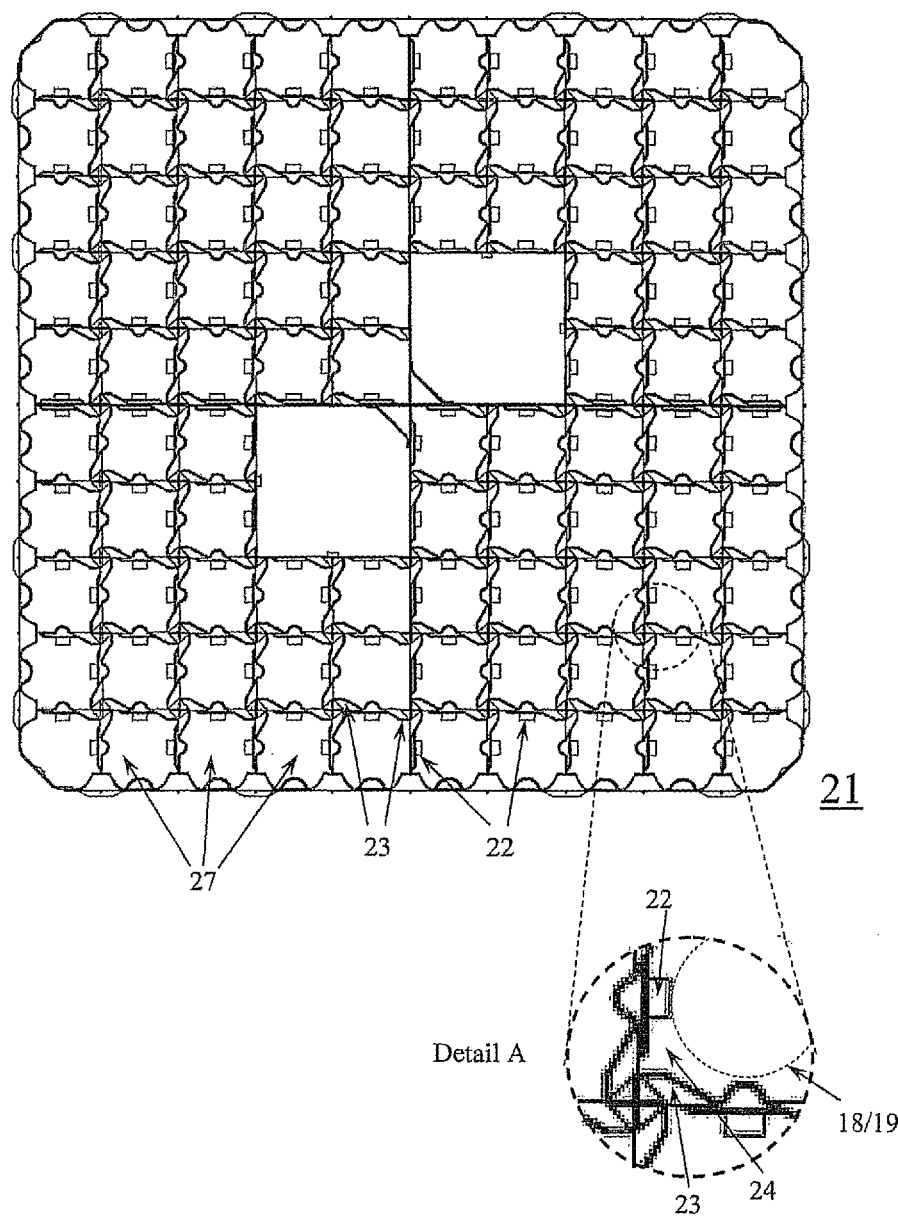
FIG. 2 is an illustration of an example embodiment grid-type fuel spacer useable in example fuel assemblies.

FIG. 2 is an illustration of an example embodiment grid-type spacer 21. As used herein, a specific "-type" spacer generally refers to all spacers having substantially similar hydraulic and operational characteristics, regardless of other minor variations in shape, size, rod matrix number, etc. As shown in FIG. 2, grid-type spacers 21 are a welded metal lattice divided into several "boxes" 27 through which fuel rods 18/19 may pass. Grid-type spacers may frictionally grip to the fuel rods through the use of resistive contact segments 22, known as stops and/or springs, abutting the exterior of each rod that passes through the spacer 20. Mixing tabs and/or swirl vanes 23 may extend from the spacer 21, in order to better mix a coolant/moderator flowing through the spacer 21 and fuel rods extending therethrough. Example embodiment grid-type spacer 21 may be modified in several ways and still be considered a grid-type spacer. For example, gaps for water rods in the spacer may be resized, reshaped, or omitted. Or for example, the number and position of boxes 27 may be varied depending on the fuel assembly dimensions and characteristics. These variations may have a negligible effect on the overall hydraulic properties of example embodiment grid-type spacers, permitting them to remain classified as grid-type spacers.

Figure 3:
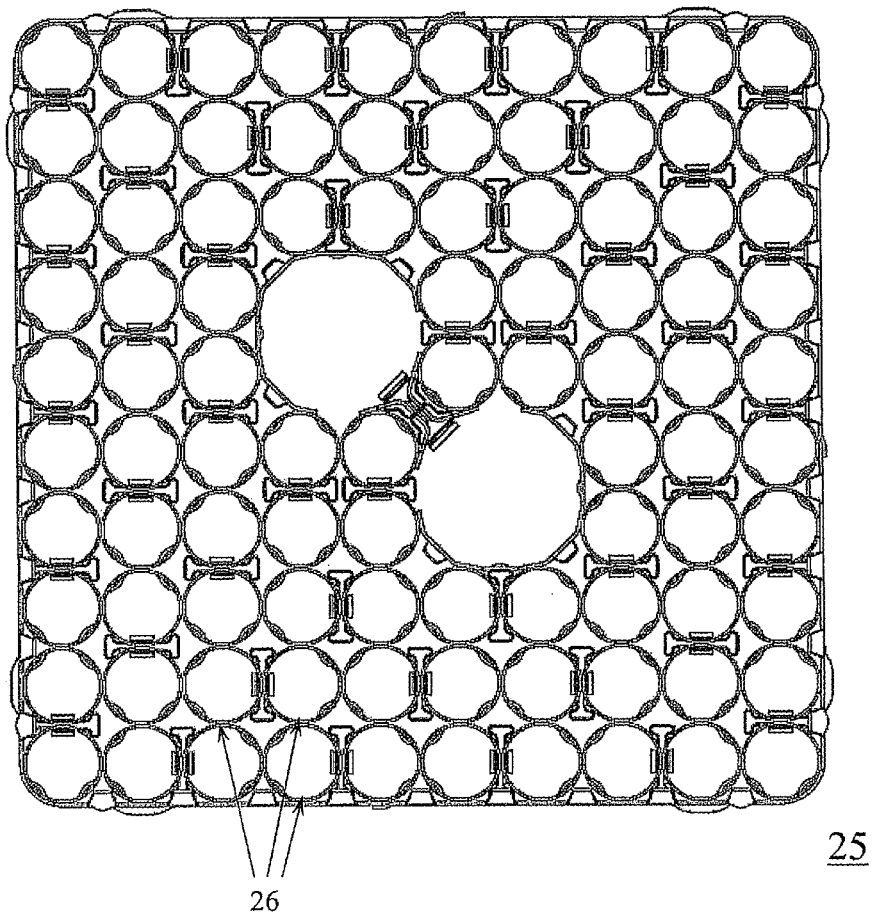
FIG. 3 is an illustration of an example embodiment ferrule-type fuel spacer useable in example fuel assemblies.

FIG. 3 is an illustration of an example embodiment ferrule-type spacer 25, including several ferrules 26 arranged in a matrix. Each ferrule 26 may elastically fit around the circumference of a fuel rod 18/19, allowing less contact between a fuel rod 18/19 and spacer 25 and/or providing a less-restrictive flow path for a liquid film flowing through gaps between fuel rod 18/19 and spacer 25. Example embodiment spacers 21 and 25 may be held stationary at constant axial positions within the fuel bundle as high velocity coolant flows axially through the bundle 10 and may maintain fuel rods 18/19 in a static orientation within a fuel bundle. Example embodiment ferrule-type spacer 25 may be modified in several ways and still be considered a ferrule-type spacer. For example, gaps for water rods in the spacer may be resized, reshaped, or omitted. Or for example, the number and position of ferrules 26 may be varied depending on the fuel assembly dimensions and characteristics. These variations may have a negligible effect on the overall hydraulic properties of example embodiment ferrule-type spacers, permitting them to remain classified as ferrule-type spacers.

The inventors have recognized that grid-type fuel spacers, such as those shown in FIG. 2, having mixing tabs or vanes enhance flow mixing of a coolant/moderator flowing through the spacers and fuel bundle containing the same. Increased flow mixing results in an improved performance and critical power ratio for some fuel bundles employing grid spacers with mixing vanes.

The inventors have recognized, however, that grid-type spacers may worsen fuel response to accident, or transient, scenarios involving an abrupt loss of coolant flow through the core. The inventors have identified that the geometry between the grids of grid-type spacers and the cylindrical fuel rod fauns a "wedge" 24, shown in detail A of FIG. 2, between the circumference of the fuel rod and corner of each grid that may shear off liquid film from the fuel rod circumference, which may precipitate the formation of dry-out patches on fuel rod surfaces. The loss of contact with liquid coolant on the fuel rod surfaces greatly decreases heat transfer to the coolant, resulting in the fuel rod overheating and potential damage to the same.

The inventors have further recognized that ferrule-type fuel spacers, such as those shown in FIG. 3, do not shear off the liquid film from the fuel rod surfaces to the degree as done by the grid-type spacers. As shown in FIG. 3, ferrule-type spacer grids do not have the "wedge" 24 present in grid-type spacer grids that may promote entrainment of liquid from the liquid film, accelerating loss of contact with liquid coolant on the fuel rod surface and/or degradation of heat transfer to the coolant. Full-scale bundle tests simulating a sudden loss of coolant core flow in Advanced Boiling Water Reactors (ABWRs) demonstrated a lower sensitivity of ferrule-type spacers to transient flow conditions relative to that of grid-type spacers, in part due to ferrule-type spacer's ability to prolong contact between liquid film flow and fuel rod surfaces. In the tests, the response to such a flow transient event, measured as the ratio of an initial margin to dryout to the smallest margin recorded during the transient, is approximately one-tenth better with ferrule-type spacers than with grid-type spacers.

The inventors have identified that spacers in exit positions—locations in the fuel bundle closer to the exit of coolant flowing through the fuel bundle—may be more susceptible to inducing loss of contact between liquid film flow and fuel rod surfaces and inducing subsequent formation of dry-out patches during transient flow conditions. Particularly, during transient flow scenarios, near the exit of the bundle, ferrule-type spacers may prolong contact between liquid film and fuel rod surfaces relative to grid-type spacers. This prolonged contact may outweigh benefits of enhanced mixing achieved by grid-type spacers with flow wings in particular situations, including, for example, when the concentration of coolant in liquid form reaches very low fractions near the exit of fuel bundle, where the side effects of the "wedge" stripping away any liquid film from the fuel rod surfaces becomes especially harmful.

Thus, example embodiment fuel bundles use both grid-type and ferrule-type spacers at locations that take most advantage of the above-recognized effects of example embodiment grid-type and ferrule-type spacers and offer improved heat transfer during normal and transient operating conditions.

Figure 1:
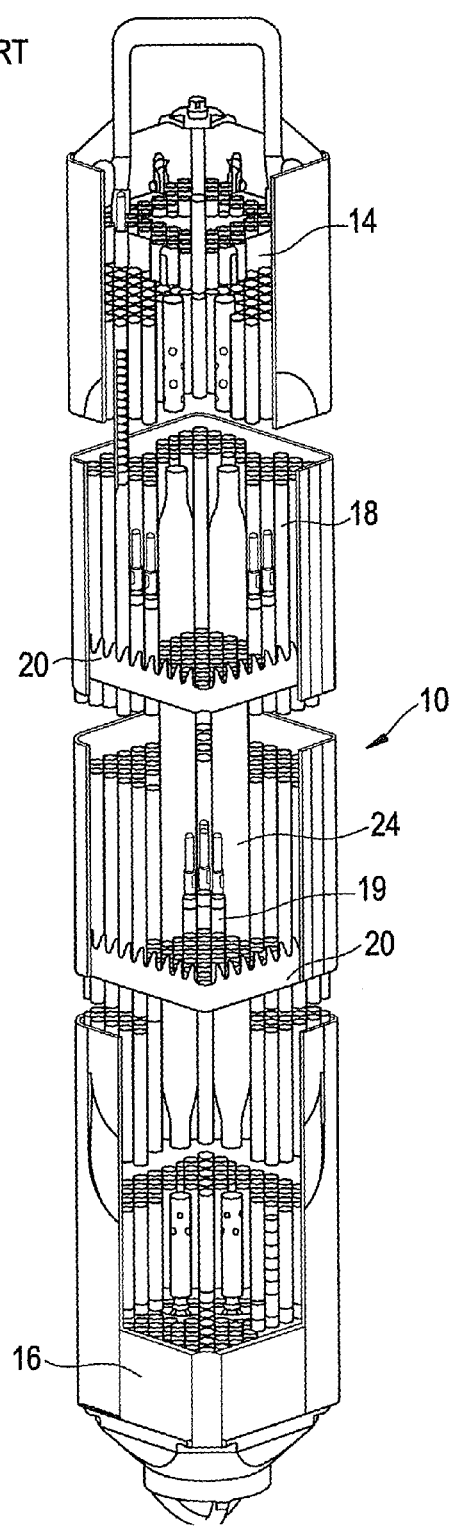
FIG. 1 is an illustration of a related art fuel assembly having grid-type spacers affixed to the assembly.
Figure 4:
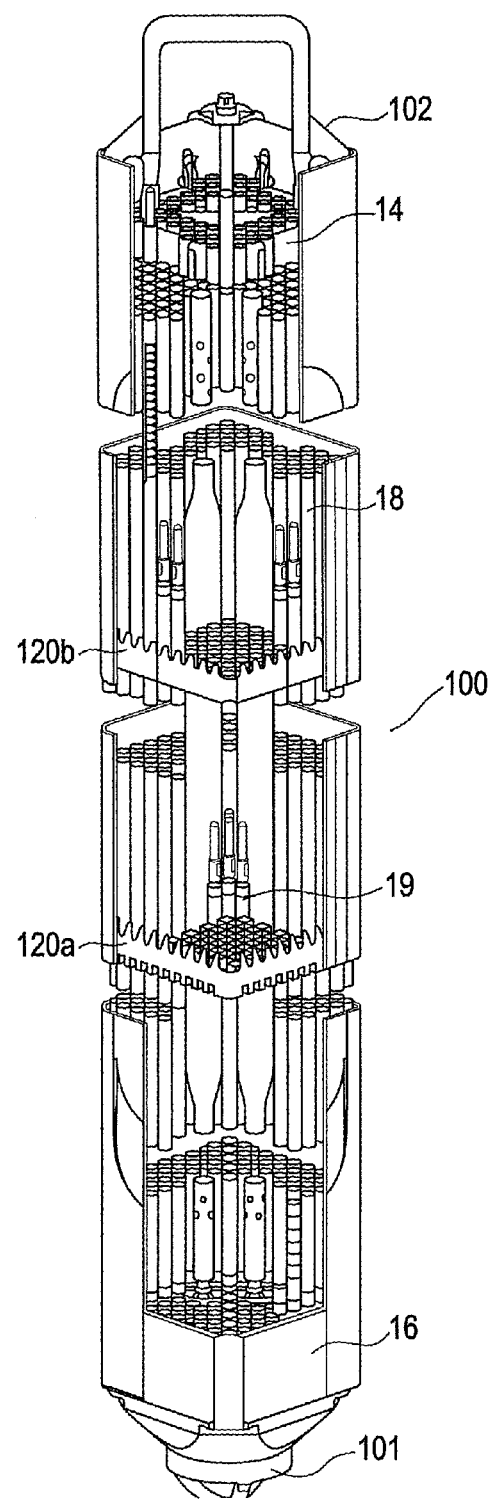
FIG. 4 is an illustration of an example embodiment fuel assembly having mixed-type fuel spacers.

FIG. 4 is an illustration of an example embodiment fuel bundle 100. As shown in FIG. 4, bundle 100 may include several features similar to that of conventional fuel bundle 10, as shown in FIG. 1, with the descriptions of redundant features omitted. Example embodiment fuel bundle 100 may include several spacers 120 of different types, based upon the axial position of the particular spacer 120. Although example embodiment fuel bundle 100 is shown with two spacers 120a and 120b, it is understood that any number of spacers may be used in example embodiment fuel bundles.

Spacer 120a near the inlet 101 of the bundle 100, where the coolant is most likely to be completely liquid, may be an example embodiment grid-type spacer 21 with mixing or flow vanes, as shown in FIG. 2. Spacer 120b nearer the exit 102 of the bundle 100, where coolant is most likely to be more voided and gaseous, may be an example embodiment ferrule-type spacer 25, as shown in FIG. 3. In this way, example fuel bundle 100 may benefit from the increased liquid mixing from example embodiment grid-type spacer 120a and the improved geometry for reduced liquid film stripping where the coolant in the form of liquid exists mostly as liquid film on fuel rod surfaces typically at spacer positions closer to the fuel bundle exit. Intermediate spacers and/or any others not shown may be either grid- or ferrule-type spacers, depending on the coolant characteristics encountered by bundle 100.

Based on the recognition of the properties of grid- and ferrule-type fuel spacers discussed above and the particular spacer location and characteristics, persons skilled in the art may determine the best spacer type for spacers 120a, b, etc. of example embodiment fuel bundle 100. For example, an engineering test may be performed to simulate coolant conditions, including core flow rate, inlet coolant temperature and void fraction, bundle temperature and heat generation rates, heat transfer rates, etc. anticipated for fuel bundles throughout the core and determine what mixture of ferrule-type and grid-type spacers at particular locations results in the best operating parameters, such as critical power ratio, departure from nucleate boiling, etc., of the fuel bundle 100.

Alternatively, a known modeling program may be used to simulate normal operating or transient scenarios in order to determine what mixture of ferrule-type and grid-type spacers at particular locations results in the best operating parameters of the fuel bundle 100.

Further alternatively, an engineer may use his or her experience and engineering analysis to predict future coolant conditions including core flow rate, inlet coolant temperature and void fraction, bundle temperature and heat generation rates, heat transfer rates, etc. will be encountered at a particular bundle location and axial position within the bundle. Based on these coolant properties, the engineer may determine what mixture of ferrule-type and grid-type spacers at particular locations results in the best operating parameters, such as critical power ratio, departure from nucleate boiling, etc. of the fuel bundle 100.

In sum, in designing and fabricating an example embodiment fuel bundle, the engineer may determine a target fuel bundle response during operation, including normal and transient operations, determine the coolant characteristics experienced during these operations, including any coolant characteristics that may be affected by spacer type, and/or assign a spacer type for each axial spacer position, based on the desired operating parameters, coolant characteristics, and spacer properties discussed above. Based on the determined spacer types and positions, an example embodiment fuel bundles can be designed in accordance with governing regulations, established design procedures, and known fabrication techniques.

Example embodiments and methods thus being described, it will be appreciated by one skilled in the art that example embodiments may be varied through routine experimentation and without further inventive activity. Variations are not to be regarded as departure from the spirit and scope of example embodiments, and all such modifications as would be obvious to one skilled in the art are to be included within the scope of the following claims.

What is claimed is:

1. A nuclear fuel bundle comprising:
a plurality of fuel rods disposed in a channel in an axial direction;
a grid spacer spanning the channel in a transverse direction at a first axial position, at least a portion of the fuel rods passing through and aligned by the grid spacer, the grid spacer being configured to frictionally grip the fuel rods; and
a ferrule spacer spanning the channel in the transverse direction at a second axial position, the ferrule spacer including a plurality of ferrules, each ferrule having a circular cross-sectional shape, the ferrule spacer configured to contact less of an outer surface of the fuel rods as compared to the grid spacer, the first axial position being closer to a coolant inlet of the nuclear fuel bundle than the second axial position, at least a portion of the fuel rods passing through and aligned by the ferrule spacer,
the grid spacer including a plurality of boxes, each box including at least one of mixing tabs and swirl vanes configured to increase mixing of a coolant flow as compared to the ferrule spacer,
wherein no additional grid spacers exist at axial positions that are further from the coolant inlet than any spacer with ferrules.

2. The fuel bundle of claim 1, further comprising:
a third spacer spanning the channel in the transverse direction at a third axial position between the second and the first axial positions, the third spacer being one of a ferrule spacer and a grid spacer, at least a portion of the fuel rods passing through and aligned by the third spacer.

3. The fuel bundle of claim 2, wherein the third spacer is of a selected type based on the coolant characteristics of the fuel bundle, the coolant characteristics including at least one of core flow rate, inlet coolant temperature and void fraction, bundle temperature, and bundle heat generation rate, and bundle-coolant heat transfer rate.

4. The fuel bundle of claim 2, wherein the third spacer is a grid spacer.

5. The fuel bundle of claim 2, wherein the third spacer is a ferrule spacer.

6. A nuclear fuel bundle comprising:
a plurality of fuel rods disposed in a channel in an axial direction;
a first spacer spanning the channel in a transverse direction at a first axial position, the first spacer including a plurality of boxes, one of the fuel rods passing through one of the boxes and frictionally mated to the first spacer via a resistive contact segment extending from the first spacer; and
a second spacer spanning the channel in the transverse direction at a second axial position, the second spacer including a plurality of ferrules arranged in a lattice, the ferrules having a circular cross-sectional shape, the second spacer configured to contact less of an outer surface of the fuel rods as compared to the first spacer, one of the fuel rods passing through one of the ferrules and frictionally mated to the second spacer via the ferrule, the first axial position being closer to a coolant inlet of the nuclear fuel bundle than the second axial position,
the boxes including at least one of mixing tabs and swirl vanes configured to increase mixing of a coolant flow as compared to the boxes,
wherein no additional spacer with boxes exist at axial positions that is further from the coolant inlet than any spacer with ferrules.

7. The fuel bundle of claim 6, further comprising:
a third spacer spanning the channel in the transverse direction at a third axial position between the second and the first axial position, the third spacer having one of boxes and ferrules.

8. The fuel bundle of claim 7, wherein the third spacer is of a selected type based on the coolant characteristics of the fuel bundle, the coolant characteristics including at least one of core flow rate, inlet coolant temperature and void fraction, bundle temperature, and bundle heat generation rate, and bundle coolant heat transfer rate.

9. The fuel bundle of claim 1, wherein the ferrules do not include either mixing tabs or swirl vanes, the ferrules being configured to provide a less restrictive flow path for the coolant flow as compared to the boxes.

10. The fuel bundle of claim 6, wherein the ferrules do not include either mixing tabs or swirl vanes, the ferrules being configured to provide a less restrictive flow path for the coolant flow as compared to the boxes.

11. The fuel bundle of claim 1, wherein each ferrule of the ferrule spacer is a cylindrical shape.

12. The fuel bundle of claim 6, wherein each ferrule of the second spacer is a cylindrical shape.

* * * * *